United States Patent [19]

Möck et al.

[11] Patent Number: 5,954,403

[45] Date of Patent: Sep. 21, 1999

[54] CAR SEAT

[75] Inventors: Christof Möck, Mannheim, Germany; Raul Pimentel, Mexico D.F., Mexico

[73] Assignee: BASF Aktiengesellschaft, Ludwigshafen, Germany

[21] Appl. No.: 08/767,480

[22] Filed: Dec. 16, 1996

[30] Foreign Application Priority Data

Dec. 21, 1995 [DE] Germany .......................... 195 47 971

[51] Int. Cl.$^6$ .................................. A47C 7/02; A47C 7/18
[52] U.S. Cl. ................................ 297/452.18; 297/DIG. 1; 297/452.48
[58] Field of Search ................. 297/DIG. 1, 452.18, 297/452.55, 452.48, 452.57; 442/372

[56] References Cited

U.S. PATENT DOCUMENTS

| | | | |
|---|---|---|---|
| 4,035,458 | 7/1977 | Lyman | 297/DIG. 1 |
| 5,037,690 | 8/1991 | Van Der Kooy | 428/116 |
| 5,340,642 | 8/1994 | Baumgarti et al. | 442/153 X |
| 5,413,661 | 5/1995 | Spengler et al. | 156/515 X |
| 5,532,055 | 7/1996 | Igarashi et al. | 428/318.6 |
| 5,542,747 | 8/1996 | Burchi | 297/DIG. 1 |

FOREIGN PATENT DOCUMENTS

| | | | |
|---|---|---|---|
| 93065 | 11/1983 | European Pat. Off. | 297/DIG. 1 |
| 2225119 | 11/1974 | France | 297/DIG. 1 |
| 2510471 | 2/1983 | France | 297/DIG. 1 |

*Primary Examiner*—Anthony D. Barfield
*Attorney, Agent, or Firm*—Oblon, Spivak, McClelland, Maier & Neustadt, P.C.

[57] ABSTRACT

A car seat comprising a frame of polyolefin foam and a core of organic fibers held together by a binder.

4 Claims, No Drawings

CAR SEAT

The present invention relates to a car seat consisting of a plurality of components.

Automotive parts are now increasingly fabricated from plastic, usually from polyurethane foam. However, this plastic has the disadvantage that it does not melt and is thus difficult to recycle. Moreover, polyurethane foams have relatively high weight. Previous attempts to fabricate car seats from the lighter and recyclable polypropylene particle foam failed because of the low rebound capacity of this foam and because it is closed-celled and thus not breathable.

It is an object of the present invention to develop recyclable car seats which have excellent cushioning properties and are breathable.

We have found that this object is achieved by car seats comprising

A. a frame of polyolefin foam and

B. a core of organic fibers held together by a binder.

Both the actual seat area and the backrest can be fabricated from the novel combination of materials. The frame is to be understood as meaning the side portions, the armrests and, where present, also the underfloor and the back of the seat, ie. regions of the seat which have a loadbearing function and therefore have to be comparatively strong; the core comprises the actual seat area and also the backrest area, ie. regions which come directly into contact with the body of the driver and therefore have to be soft, flexible and breathable.

The frame material can in principle be any closed-celled polyolefin foam. Preference is given to particle foams, which consist of a multiplicity of fused foam particles. Suitable polyolefins include polyethylene and polypropylene and also copolymers of ethylene and propylene. Preference is given to propylene copolymers having a melting point within the range from 125 to 150° C. The melting point in question is the crystallite melting point, the second DSC peak of the melted sample. Copolymers of propylene with from 1 to 30% by weight, in particular from 1 to 6% by weight, of ethylene and/or butene-1 are particularly highly suitable. The foam is a particle foam as obtainable by fusing foam particles, customarily having an average diameter of from 2 to 8 mm, preferably of from 3 to 6 mm. The average density of the foam, ie. the density averaged over all density regions of the shaped article, is within the range from 0.015 to 0.15 g/cm$^3$, preferably within the range from 0.02 to 0.08 g/cm$^3$.

The foam frame is prepared from the foam particles by welding by means of hot gases, for example steam or hot air, in molds. This procedure makes it possible to produce articles of any shape in one operation without a subsequent finishing step. Openings and fastening means in the molded article can be provided as required. Fittings of metal or thermally stable plastics can be incorporated in situ.

The fiber core consists of organic fibers joined together by a binder. Suitable fibers are natural fibers, for example fibers of coir, cellulose, sisal, hemp, flax, jute or banana. In principle it is also possible to use synthetic fibers, for example polyamide, polyester or polypropylene. Preference is given to coir fibers. The fibers are usually random laid as continuous filament fibers or preferably as fibers from 1 to 10 cm in length to form a mat and joined together by the binder. In the case of the preferred coir fibers, long fibers are first spun into a rope. The fibers are then cut and laid down loosely to form a mat. The fibers are bonded together by spraying or saturating the mat with an aqueous dispersion of the binder. The preferred binder is rubber in the form of an aqueous latex which may include customary additives, for example pH modifiers, viscosity regulators and dispersion aids and also vulcanization aids, such as sulfur, zinc oxide and antioxidants. In principle it is also possible to use synthetic resins, such as butadiene-styrene copolymers, acrylates, polyvinyl acetate and ethylene-vinyl acetate copolymers, which may contain crosslinking groups, for example N-methylolacrylamide. After the fiber mat has been impregnated with the binder it is dried in a circulating air oven at from 100 to 130° C. and the binder is optionally vulcanized or crosslinked. Ready-made cores can be cut out of the mats thus produced. It is also possible to superpose a plurality of cuts, impregnate them again with binder dispersion, dry, and crosslink them. The shaping of the core can also be effected by pressing in suitable steel molds at elevated temperature. In the finished core the weight ratio of binder to fiber is preferably within the range from 1:1 to 3:1, in particular within the range from 1.2:1 to 1.6:1. The core material is air-permeable and breathable to that extent.

The density of the core material is in general within the range from 60 to 100 g/l; the thickness of the core can vary within wide limits from 0.5 to 10 cm. Preference is given to a thickness of from 1 to 5 cm, but depending on the cut of the core it can also have regions of differing thickness.

The bond between frame and core can be produced by means of fiber webs, based for example on acrylate or polyester, which are adhered to frame and core. However, in the production of the frame, the bond between frame and core can also be realized by directly welding the particles to the core.

The finished car seat additionally includes a customary textile cover and also fastening elements and optionally reinforcing inserts and metallic stiffening elements.

We claim:

1. A car seat comprising:

A) a frame of polypropylene particle foam having a density of from 0.015 to 0.15 g/cm$^3$, and B) a core of coir fibers having a length of from 1 to 10 cm, wherein said core has a thickness of at least 1 cm and wherein said coir fibers are bound together by a binder selected from the group consisting of vulcanized rubbers and crosslinked synthetic resins, wherein said core provides the car seat with softness, flexibility and breathability.

2. A car seat as claimed in claim 1, consisting of backrest and seat area, each including a frame and a core.

3. A car seat as claimed in claim 1, wherein frame and core are adhered together by means of a fiber web.

4. A car seat as claimed in claim 1, wherein the core is integrated in the frame without adhesive bonding.

* * * * *